United States Patent
Brugman et al.

(10) Patent No.: US 11,011,063 B2
(45) Date of Patent: May 18, 2021

(54) DISTRIBUTED DATA COLLECTION AND PROCESSING AMONG VEHICLE CONVOY MEMBERS

(71) Applicant: Toyota Motor North America, Inc., Plano, TX (US)

(72) Inventors: Louis Brugman, Frisco, TX (US); Devang H. Parekh, Dallas, TX (US)

(73) Assignee: TOYOTA MOTOR NORTH AMERICA, INC., Plano, TX (US)

( * ) Notice: Subject to any disclaimer, the term of this patent is extended or adjusted under 35 U.S.C. 154(b) by 252 days.

(21) Appl. No.: 16/193,115

(22) Filed: Nov. 16, 2018

(65) Prior Publication Data

US 2020/0160722 A1  May 21, 2020

(51) Int. Cl.
*G08G 1/00* (2006.01)
*B60W 40/02* (2006.01)
*H04W 4/46* (2018.01)

(52) U.S. Cl.
CPC ............ *G08G 1/22* (2013.01); *B60W 40/02* (2013.01); *H04W 4/46* (2018.02); *B60W 2556/65* (2020.02)

(58) Field of Classification Search
CPC ......... G08G 1/22; G08G 1/202; B60W 40/02; B60W 2556/65; H04W 4/46; H04W 4/40; H04W 4/70; H04W 28/0215
See application file for complete search history.

(56) References Cited

U.S. PATENT DOCUMENTS

| 7,049,945 B2 * | 5/2006 | Breed | G01S 7/481 340/435 |
| 7,979,173 B2 * | 7/2011 | Breed | G01S 19/43 701/23 |

(Continued)

FOREIGN PATENT DOCUMENTS

| CN | 105431343 A | * 3/2016 | ............ B61L 25/028 |
| CN | 106030556 A | * 10/2016 | .............. H04W 4/80 |

(Continued)

OTHER PUBLICATIONS

Vinel, Alexey, Lan, Lin, Lyamin, Nikita; "Vehicle-to-Vehicle Communication in C-ACC/Platooning Scenarios," https://www.researchgate.net/publication/280970675_Vehicle-to-Vehicle_Communication_in_C-ACCPlatooning_Scenarios; Accessed/Published: Aug. 2015.

(Continued)

*Primary Examiner* — Hunter B Lonsberry
*Assistant Examiner* — Jalal C Coduroglu
(74) *Attorney, Agent, or Firm* — Dinsmore & Shohl LLP

(57) ABSTRACT

A vehicle convoy management system includes a processor and a non-transitory computer readable memory configured to store a machine-readable instruction set. The machine-readable instruction set causes the vehicle convoy management system to: determine a first vehicle and a second vehicle form a convoy, delegate a first task to the first vehicle based on a first set of sensor resources of the first vehicle, delegate a second task to the second vehicle based on a second set of sensor resources of the second vehicle, where the first task is distinct from the second task, receive a first information generated in response to the first vehicle completing the first task with the first set of sensor resources, receive a second information generated in response to the second vehicle completing the second task, and transmit at (Continued)

least one of the first information or the second information to at least one vehicle.

20 Claims, 5 Drawing Sheets

(56) References Cited

U.S. PATENT DOCUMENTS

| | | | | |
|---|---|---|---|---|
| 8,255,144 | B2* | 8/2012 | Breed | G05D 1/0246 |
| | | | | 701/117 |
| 8,370,055 | B2* | 2/2013 | Koehler | B60W 30/12 |
| | | | | 701/300 |
| 8,599,038 | B2 | 12/2013 | Yamashiro | |
| 8,713,215 | B2* | 4/2014 | Wade | G06F 13/4022 |
| | | | | 710/30 |
| 8,892,271 | B2* | 11/2014 | Breed | G08G 1/161 |
| | | | | 701/2 |
| 8,947,531 | B2* | 2/2015 | Fischer | H04N 13/243 |
| | | | | 348/148 |
| 9,031,896 | B2* | 5/2015 | Mathews | G06N 7/005 |
| | | | | 706/52 |
| 9,141,112 | B1* | 9/2015 | Loo | G08G 1/096866 |
| 9,165,470 | B2* | 10/2015 | Mudalige | G08G 1/22 |
| 9,182,764 | B1* | 11/2015 | Kolhouse | G01C 21/3469 |
| 9,415,687 | B2* | 8/2016 | Utsugi | B60K 37/00 |
| 9,429,941 | B2* | 8/2016 | Ohmura | B60K 28/066 |
| 9,567,080 | B2* | 2/2017 | Bookless | G06Q 10/20 |
| 9,650,059 | B2* | 5/2017 | Cooper | B61L 23/044 |
| 9,665,102 | B2* | 5/2017 | Switkes | G05D 1/0297 |
| 9,731,650 | B2* | 8/2017 | Gee | B60Q 5/006 |
| 9,786,182 | B2* | 10/2017 | Calmettes | G05D 1/0293 |
| 9,817,404 | B1* | 11/2017 | Loo | H04W 4/08 |
| 9,852,637 | B2 | 12/2017 | Hayee et al. | |
| 10,053,120 | B2* | 8/2018 | Brooks | B60L 15/2045 |
| 10,078,338 | B2* | 9/2018 | Smartt | G05D 1/0285 |
| 10,202,131 | B2* | 2/2019 | Bresnahan | B61K 1/00 |
| 10,252,721 | B1* | 4/2019 | Bai | G08G 1/22 |
| 10,304,027 | B1* | 5/2019 | Haque | G06Q 50/30 |
| 10,332,403 | B2* | 6/2019 | Saigusa | G05D 1/0223 |
| 10,384,678 | B1* | 8/2019 | Konrardy | B60R 16/0234 |
| 10,394,253 | B1* | 8/2019 | Loo | H04W 4/46 |
| 10,535,207 | B1* | 1/2020 | Goluguri | H04W 4/40 |
| 10,698,421 | B1* | 6/2020 | Harris | H04W 4/40 |
| 10,748,428 | B2* | 8/2020 | Park | B60W 50/14 |
| 10,824,884 | B2* | 11/2020 | Dhana Sekaran | |
| | | | | G06K 9/00805 |
| 2006/0025897 | A1* | 2/2006 | Shostak | G08G 1/017 |
| | | | | 701/1 |
| 2008/0161986 | A1* | 7/2008 | Breed | G01S 19/07 |
| | | | | 701/23 |
| 2009/0079839 | A1* | 3/2009 | Fischer | G01S 17/86 |
| | | | | 348/218.1 |
| 2009/0326818 | A1* | 12/2009 | Koehler | B60W 30/12 |
| | | | | 701/300 |
| 2013/0281141 | A1* | 10/2013 | Rubin | G08G 1/16 |
| | | | | 455/500 |
| 2014/0302774 | A1* | 10/2014 | Burke | H04W 4/08 |
| | | | | 455/3.05 |
| 2014/0309836 | A1* | 10/2014 | Ollis | G01C 21/00 |
| | | | | 701/25 |
| 2015/0134181 | A1* | 5/2015 | Ollis | G01C 21/00 |
| | | | | 701/23 |
| 2015/0134182 | A1* | 5/2015 | Ollis | G08G 1/22 |
| | | | | 701/23 |
| 2015/0154871 | A1* | 6/2015 | Rothoff | G05D 1/0295 |
| | | | | 701/2 |
| 2016/0054735 | A1* | 2/2016 | Switkes | H04W 4/44 |
| | | | | 701/23 |
| 2017/0011633 | A1* | 1/2017 | Boegel | B60W 30/18163 |
| 2017/0174236 | A1* | 6/2017 | Worden | B61L 3/008 |
| 2017/0234966 | A1* | 8/2017 | Naguib | G01S 5/22 |
| | | | | 367/117 |
| 2017/0236537 | A1* | 8/2017 | Murakami | G11B 5/315 |
| | | | | 360/125.3 |
| 2017/0272450 | A1* | 9/2017 | Krishnamurthi | H04W 4/023 |
| 2017/0278403 | A1* | 9/2017 | Pitcher | G01S 17/933 |
| 2017/0369062 | A1* | 12/2017 | Saigusa | B60W 30/16 |
| 2018/0190128 | A1* | 7/2018 | Saigusa | B60W 30/162 |
| 2018/0211544 | A1* | 7/2018 | Smartt | G06F 21/30 |
| 2018/0211545 | A1* | 7/2018 | Smartt | G08G 1/161 |
| 2018/0211546 | A1* | 7/2018 | Smartt | G05D 1/0088 |
| 2018/0268698 | A1* | 9/2018 | Michalakis | G08G 1/162 |
| 2018/0322791 | A1* | 11/2018 | Brooks | G08G 1/22 |
| 2019/0011532 | A1* | 1/2019 | Loesch | G01S 13/42 |
| 2019/0272500 | A1* | 9/2019 | Haque | G06Q 10/0833 |
| 2020/0057453 | A1* | 2/2020 | Laws | B60W 10/20 |
| 2020/0130689 | A1* | 4/2020 | Hanslik | B60W 30/16 |
| 2020/0150663 | A1* | 5/2020 | Parekh | G05D 1/0251 |
| 2020/0160722 | A1* | 5/2020 | Brugman | H04W 4/46 |
| 2020/0175869 | A1* | 6/2020 | Khoo | G08G 1/096844 |
| 2020/0177885 | A1* | 6/2020 | Brugman | H04N 7/18 |
| 2020/0202716 | A1* | 6/2020 | Edwards | G08G 1/096855 |
| 2020/0207360 | A1* | 7/2020 | Dougherty | B60W 60/0017 |
| 2020/0207371 | A1* | 7/2020 | Dougherty | B60W 40/02 |
| 2020/0220633 | A1* | 7/2020 | Parekh | H04H 60/65 |
| 2020/0257298 | A1* | 8/2020 | Ucar | H04W 4/46 |
| 2020/0272145 | A1* | 8/2020 | Kinoshita | H04W 4/40 |
| 2020/0326707 | A1* | 10/2020 | Shashua | G06K 9/00818 |
| 2020/0394915 | A1* | 12/2020 | Salles | G01S 5/22 |
| | | | | 367/117 |

FOREIGN PATENT DOCUMENTS

| | | | | |
|---|---|---|---|---|
| CN | 107014425 | A * | 8/2017 | H04W 4/08 |
| CN | 107452218 | A * | 12/2017 | B61L 15/0072 |
| CN | 108140310 | A * | 6/2018 | H04W 4/40 |
| CN | 108153296 | A * | 6/2018 | H04W 4/08 |
| CN | 105431343 | B * | 7/2018 | B61L 25/028 |
| CN | 108398958 | A * | 8/2018 | B61L 15/0072 |
| CN | 109739650 | A * | 5/2019 | G06F 9/50 |
| DE | 102017004721 | A1 | 12/2017 | |
| DE | 102016225073 | A1 * | 6/2018 | G01S 5/18 |
| DE | 102017221617 | A1 * | 7/2018 | B60W 40/04 |
| EP | 2793043 | A1 * | 10/2014 | G01S 3/8083 |
| EP | 2800032 | A1 * | 11/2014 | G06Q 10/0631 |
| EP | 2922040 | A1 * | 9/2015 | G05D 1/0293 |
| EP | 3091520 | A1 * | 11/2016 | H04W 4/80 |
| EP | 2922040 | B1 * | 4/2018 | G01S 19/03 |
| FR | 2860610 | A1 * | 4/2005 | G06Q 10/06 |
| GB | 2552029 | A * | 1/2018 | H04W 4/08 |
| GB | 2559159 | A * | 8/2018 | G06Q 10/08 |
| JP | 6261599 | B2 * | 1/2018 | H04L 67/12 |
| KR | 20170126909 | A * | 11/2017 | B60W 30/165 |
| WO | WO-2014145918 | A1 * | 9/2014 | B60W 30/165 |
| WO | WO-2014177882 | A1 * | 11/2014 | G05D 1/0027 |
| WO | WO-2017029381 | A1 * | 2/2017 | B60C 23/0466 |
| WO | WO-2017147007 | A1 * | 8/2017 | G08G 1/22 |
| WO | WO-2018039644 | A1 * | 3/2018 | G05D 1/0016 |
| WO | WO-2018050356 | A1 * | 3/2018 | G06Q 50/30 |
| WO | WO-2018063713 | A1 * | 4/2018 | G01S 5/18 |
| WO | WO-2018109443 | A1 * | 6/2018 | B60C 23/0481 |
| WO | WO-2018138312 | A1 * | 8/2018 | G06Q 10/0631 |

OTHER PUBLICATIONS

Hobart, Laurens, Festag, Andreas, Llaster, Ignacio, Allomare, Luciano, Visintainer, Filippo, Kovacs, Andras, "Enhancements of V2X Communication in Support of Cooperative Autonomous Driving," https://www.researchgate.net/publication/291019002_Enhancements_of_V2X_Communication_in_Support_of_Cooperative_Autonomous_Driving?_sg=AG32kgF0Ru6XfA1Bducn2D89LApqED1Wc Xjn4z BhqRaYGwK6WmihL0Ou1dRuPOe4TxxUigBa4bDwKBS6zF7YI 78SznWgudKQ; Published/Accessed: Dec. 2015.

Llaster, Ignacio, Festag, Andreas, Fettweis, Gerhard, "Vehicular Communication Performance in Convoys of Automated Vehicles," https://www.researchgate.net/publication/305676150; Published/Accessed: Mar. 11, 2018.

(56) References Cited

OTHER PUBLICATIONS

Cao et al., "Video Processing on the Edge for Multimedia IoT Systems" https://arxiv.org/pdf/1805.04837.pdf Published: May 13, 2018.

* cited by examiner

DISTRIBUTED DATA COLLECTION AND PROCESSING AMONG VEHICLE CONVOY MEMBERS

TECHNICAL FIELD

The present specification generally relates to vehicle convoy management systems and methods and, more specifically, vehicle convoy systems and methods for managing the distribution of data collection and processing among vehicles traveling in a convoy.

BACKGROUND

Autonomous and non-autonomous vehicles increasingly include systems enabled with numerous sensor resources capable of supporting a driver with maneuvering a vehicle and/or automatically maneuvering a vehicle through an environment. As the level of sophistication increases with the demand for additional driver assistive systems and automatic control of a vehicle, the systems require an ever-increasing amount of computing resources within the vehicle. To handle the increased computational requirements of vehicle systems, some vehicles utilize off-board processing resources to complete analysis and computation of data.

Additionally, in situations where vehicles travel together in a convoy, information about an environment may be processed independently by each vehicle, thereby duplicating the collection of sensor data and processing of said sensor data.

SUMMARY

In one embodiment, a vehicle convoy management system includes a processor and a non-transitory computer readable memory configured to store a machine-readable instruction set. The machine-readable instruction set causes the vehicle convoy management system to perform at least the following when executed by the processor: determine a first vehicle and a second vehicle form a convoy, delegate a first task to the first vehicle based on a first set of sensor resources of the first vehicle, and delegate a second task to the second vehicle based on a second set of sensor resources of the second vehicle, where the first task is distinct from the second task. The machine-readable instruction set further causes the vehicle convoy management system to: receive, from the first vehicle, a first information generated in response to the first vehicle completing the first task with the first set of sensor resources, receive, from the second vehicle, a second information generated in response to the second vehicle completing the second task with the second set of sensor resources, and transmit at least one of the first information or the second information to at least one vehicle.

In some embodiments, a vehicle includes a processor and a non-transitory computer readable memory configured to store a machine-readable instruction set. The machine-readable instruction set causes at least the following when executed by the processor: determine the vehicle and a second vehicle form a convoy, delegate a first task to the vehicle based on a first set of sensor resources of the vehicle, delegate a second task to the second vehicle based on a second set of sensor resources of the second vehicle, where the first task is distinct from the second task, and generate a first information in response to the first task with the first set of sensor resources. The machine-readable instruction set further causes the processor of the vehicle to: receive, from the second vehicle, a second information generated in response to the second vehicle completing the second task with the second set of sensor resources and transmit the first information to the second vehicle.

In some embodiments, a vehicle convoy management method includes determining a first vehicle and a second vehicle form a convoy, delegating a first task to the first vehicle based on a first set of sensor resources of the first vehicle, and delegating a second task to the second vehicle based on a second set of sensor resources of the second vehicle, where the first task is distinct from the second task. The vehicle convoy management method further includes receiving, from a first computing device of the first vehicle, a result of the first task that is delegated to the first vehicle, and transmitting, to a second computing device of the second vehicle, the result of the first task that is delegated to the first vehicle.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

The embodiments disclosed herein relate to systems and methods for managing the distribution of data collection and processing the collected data for sharing among vehicles traveling in a convoy. Currently, in situations where vehicles travel together in a convoy, information about an environment may be processed independently by each vehicle, thereby duplicating the collection of sensor data and processing of the sensor data. However, by distributing, among vehicles in the convoy, tasks related to the collection, processing, and sharing of information obtained through vehicle sensor resources, the duplication and redundancy of the collection and processing of information may be reduced. Additionally, by distributing tasks among the vehicles traveling within a convoy, information about an environment that may not be obtainable by a single vehicle may be collected, processed, and shared with one or more other vehicles of the convoy.

Embodiments described herein include vehicle-to-vehicle communication systems, sensor systems for collecting data, and computing devices for processing the data and sharing the processed information among the vehicles traveling in the convoy. The systems and methods described herein may relate to autonomous vehicles, non-autonomous vehicles, or a combination of both traveling together in a convoy. Additionally, vehicles may include various sensor resources. In some instances, a vehicle may not be configured with sensors for around view monitoring (i.e., a system configured to monitor an environment around a vehicle), however, one or more sensor recourses from one or more of the other vehicles traveling in the convoy may be tasked with providing processed information about a particular area of an environment such that around view monitoring may be implemented for the vehicles of the convoy.

As will be described herein, through the management and distribution of data collection tasks and subsequent processing and distribution of the results of the tasks to the vehicles traveling in a convoy, duplication of the collection and processing of sensor data that is relevant to one or more vehicles traveling in a convoy may be reduced. Systems and methods for managing the distribution of data collection and processing of the same among vehicles traveling in a convoy will now be described herein.

Figure 1:
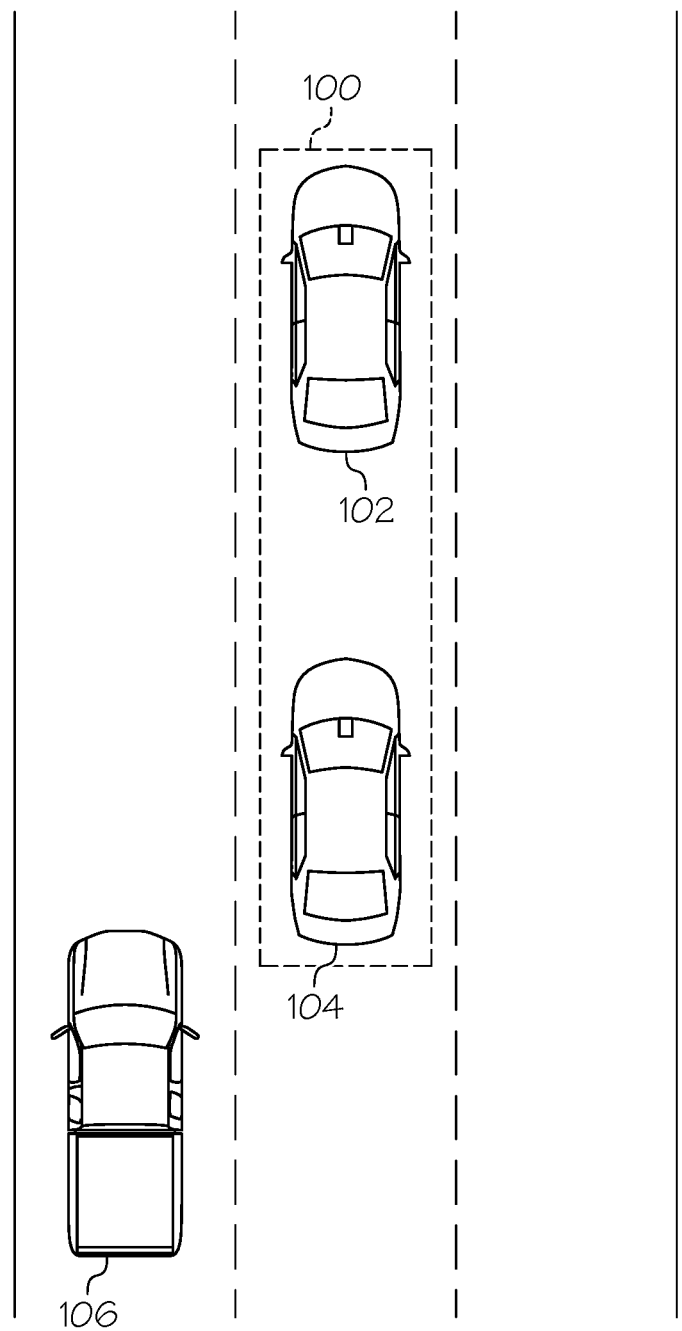
FIG. 1 depicts an illustrative embodiment of two vehicles traveling in a convoy according to one or more embodiments shown and described herein.

Turning now to the drawings wherein like numbers refer to like structures, and particularly to FIG. 1, an illustrative embodiment of two vehicles traveling in a convoy is depicted. As shown, a convoy 100 includes a first vehicle 102 and a second vehicle 104. A third vehicle 106, which is not part of the convoy, is also traveling along the road with the convoy 100. In embodiments, which will be described in more detail herein, two or more vehicles that are determined to be traveling together may form a convoy. A convoy 100 may also be referred to as a caravan or a group. As used herein, it is understood that a convoy 100 defines two or more vehicles traveling together and configured to support each other.

In FIG. 1, the convoy 100 includes a first vehicle 102 and a second vehicle 104, where the second vehicle 104 is traveling behind the first vehicle 102. Traveling in a line formation, where one vehicle travels behind another, is one example of a convoy configuration. However, it is understood that the vehicles of a convoy may not travel in a line formation or within line of sight of each other. In some embodiments, the vehicles of a convoy may be separated by other vehicles on the road or may be a few miles apart, but still traveling together. As such, the delegation of tasks to the vehicles in the convoy may depend on relative position among vehicles traveling in the convoy.

In some embodiments, a first vehicle 102 may be tasked with the collecting and processing of GPS, camera, and other related sensor data for determining information related to navigation while a second vehicle 104 may be tasked with collecting and processing sensor information related to weather conditions. The results of the processed data from sensors related to navigation by the first vehicle 102 (e.g., whether there is traffic or an accident along the route) may be transmitted to the second vehicle 104, such that the second vehicle 104 may not need to make an independent determination of traffic or accidents along the route. Similarly, the result of processing data from sensors for determining the weather by the second vehicle 104 may be transmitted to the first vehicle 102. Further examples will be discussed and described herein.

Figure 2:
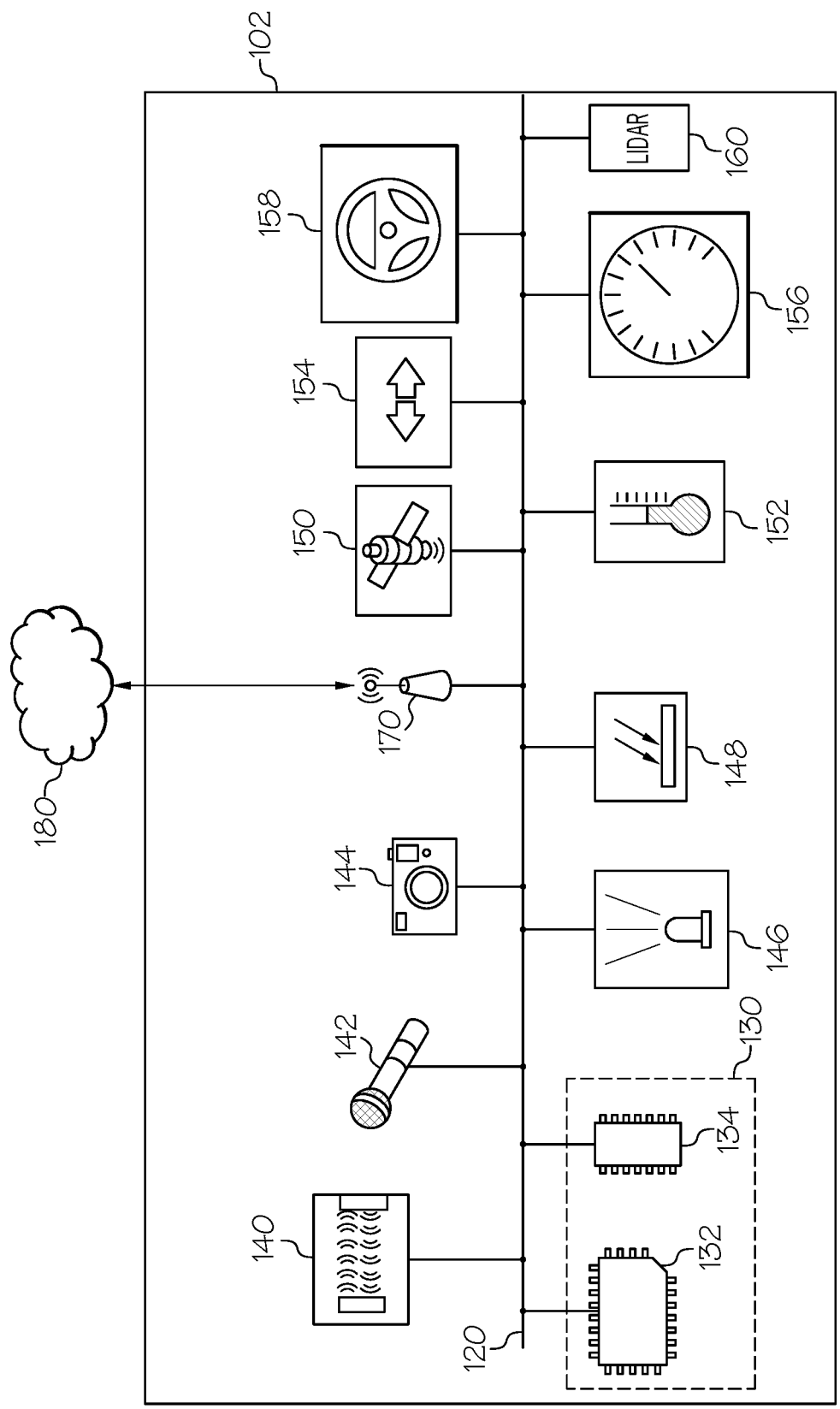
FIG. 2 schematically depicts components of a vehicle including sensor resources and a computing device according to one or more embodiments shown and described herein.

Referring now to FIG. 2, an example schematic of a vehicle including sensor resources and a computing device is depicted. Not every vehicle is required to be equipped with the same set of sensor resources, nor is required to be configured with the same set of systems for determining attributes about an environment. FIG. 2 only provides one example configuration of sensor resources and systems equipped within a vehicle. Furthermore, although FIG. 2 references vehicle 102, any vehicle, for example vehicles 104 and 106, discussed and described herein may include the same or similar configuration as vehicle 102 that is shown and described with respect to FIG. 2.

In particular, FIG. 2 provides an example schematic of a vehicle including a variety of sensor resources, which may be utilized, by a vehicle 102 to determine an attribute about an environment and share that result with another vehicle (e.g., vehicle 104, FIG. 1) traveling with the vehicle 102 in a convoy. For example, a vehicle 102 may include a computing device 130 comprising a processor 132 and a non-transitory computer readable memory 134, a proximity sensor 140, a microphone 142, one or more cameras 144, an infrared light emitter 146 and infrared detector 148, a global positioning system (GPS) 150, weather sensors 152, a blind spot monitor 154, a vehicle speed sensor 156, a steering wheel sensor system 158, a LIDAR system 160, and network interface hardware 170. These and other components of the vehicle may be communicatively connected to each other via a communication path 120.

The communication path 120 may be formed from any medium that is capable of transmitting a signal such as, for example, conductive wires, conductive traces, optical waveguides, or the like. The communication path 120 may also refer to the expanse in which electromagnetic radiation and their corresponding electromagnetic waves traverses. Moreover, the communication path 120 may be formed from a combination of mediums capable of transmitting signals. In one embodiment, the communication path 120 comprises a combination of conductive traces, conductive wires, connectors, and buses that cooperate to permit the transmission of electrical data signals to components such as processors, memories, sensors, input devices, output devices, and communication devices. Accordingly, the communication path 120 may comprise a bus. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium. As used herein, the term "communicatively coupled" means that coupled components are capable of exchanging signals with one another such as, for example, electrical signals via conductive medium, electromagnetic signals via air, optical signals via optical waveguides, and the like.

The computing device 130 may be any device or combination of components comprising a processor 132 and non-transitory computer readable memory 134. The processor 132 may be any device capable of executing the machine-readable instruction set stored in the non-transitory computer readable memory 134. Accordingly, the processor 132 may be an electric controller, an integrated circuit, a microchip, a computer, or any other computing device. The processor 132 is communicatively coupled to the other components of the vehicle 102 by the communication path 120. Accordingly, the communication path 120 may communicatively couple any number of processors 132 with one another, and allow the components coupled to the communication path 120 to operate in a distributed computing environment. Specifically, each of the components may operate as a node that may send and/or receive data. While the embodiment depicted in FIG. 2 includes a single processor 132, other embodiments may include more than one processor 132.

The non-transitory computer readable memory 134 may comprise RAM, ROM, flash memories, hard drives, or any non-transitory memory device capable of storing machine-readable instructions such that the machine-readable instructions can be accessed and executed by the processor 132. The machine-readable instruction set may comprise logic or algorithm(s) written in any programming language of any generation (e.g., 1GL, 2GL, 3GL, 4GL, or 5GL) such as, for example, machine language that may be directly executed by the processor 132, or assembly language, object-oriented programming (OOP), scripting languages, microcode, etc., that may be compiled or assembled into machine readable instructions and stored in the non-transitory computer readable memory 134. Alternatively, the machine-readable instruction set may be written in a hardware description language (HDL), such as logic implemented via either a field-programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components. While the embodiment depicted in FIG. 2 includes a single non-transitory computer readable memory 134, other embodiments may include more than one memory module.

Still referring to FIG. 2, the proximity sensor 140 may be any device or combination of components capable of outputting a signal indicative of the presence or absence of an object within or near the vehicle 102. The proximity sensor 140 may also be a sensor capable of determining a range or distance to an object, for example the distance from the vehicle 102 and another vehicle that is traveling in front of the vehicle 102. The proximity sensor 140 may include one or more sensors including, but not limited to, a camera, a laser distance sensor, an ultrasonic sensor, a radar sensor system, a motion sensor, a heat sensor, to determine the presence or absence of an object alongside, behind, or in front of the vehicle 102. In some embodiments, one or more proximity sensors 140 may be configured to enable an around view monitoring system for the vehicle 102.

The microphone 142 is coupled to the communication path 120 and communicatively coupled to the computing device 130. The microphone 142 may be any device capable of transforming a mechanical vibration associated with sound into an electrical signal indicative of the sound. The microphone 142 may be used to monitor sound levels for purposes such as determining the existence of traffic, approaching emergency vehicles, or the like within the environment of the vehicle 102.

The vehicle 102 may further include one or more cameras 144. The one or more cameras 144 may enable a variety of different monitoring, detection, control, and/or warning systems within a vehicle 102. The one or more cameras 144 may be any device having an array of sensing devices (e.g., a CCD array or active pixel sensors) capable of detecting radiation in an ultraviolet wavelength band, a visible light wavelength band, or an infrared wavelength band. The one or more cameras 144 may have any resolution. The one or more cameras 144 may be an omni-direction camera or a panoramic camera. In some embodiments, one or more optical components, such as a mirror, fish-eye lens, or any other type of lens may be optically coupled to the one or more cameras 144.

In some embodiments, an infrared light emitter 146 and/or infrared detector 148 are coupled to the communication path 120 and communicatively coupled to the computing device 130. Infrared light, also known as infrared radiation is a type of electromagnetic (EM) radiation like visible light, but infrared light is generally invisible to the human eye. EM radiation is transmitted in waves or particles across a range of wavelengths and frequencies. Infrared light waves are longer than those of visible light, beyond the red end of the visible spectrum. An infrared light emitter 146 emits infrared light in the range of the (EM) spectrum between microwaves and visible light. Infrared light has frequencies from about 300 GHz up to about 400 THz and wavelengths of about 1 millimeter to 740 nanometers, although these values are not absolute. The spectrum of infrared light can be described in sub-divisions based on wavelength and frequency. For example, near-infrared may have a frequency of about 214 THz to about 400 THz and a wavelength to about 1400 nanometers of about 740 nanometers and far-infrared may have a frequency of about 300 GHz to about 20 THz and a wavelength of about 1 millimeter to about 15 micrometers. Infrared light may be subdivided into further divisions.

An infrared detector 148 may be configured to detect light emitted and/or reflected that is within the infrared light spectrum. The infrared light emitter 146 and infrared detector 148 may be implemented as sensor resources of a vehicle to provide computer vision and navigation capability to the vehicle 102 during low light or poor weather conditions. The infrared detector 148 may be a device configured to capture the presence of infrared light, for example, determining the presence of a reflection of infrared light off an object or may include a CCD array or active pixel sensors that may be configured to generate an image of an environment that is illuminated by or that is producing infrared light.

Still referring to FIG. 2, a global positioning system, GPS 150, may be coupled to the communication path 120 and communicatively coupled to the computing device 130 of the vehicle 102. The GPS 150 is capable of generating location information indicative of a location of the vehicle 102 by receiving one or more GPS signals from one or more GPS satellites. The GPS signal communicated to the computing device 130 via the communication path 120 may include location information comprising a National Marine Electronics Association (NMEA) message, a latitude and longitude data set, a street address, a name of a known location based on a location database, or the like. Additionally, the GPS 150 may be interchangeable with any other system capable of generating an output indicative of a location. For example, a local positioning system that provides a location based on cellular signals and broadcast towers or a wireless signal detection device capable of triangulating a location by way of wireless signals received from one or more wireless signal antennas.

The vehicle 102 may also include weather sensors 152, such as temperature sensors, precipitation gauges, wind meters, UV light sensors, or the like. The weather sensors 152 may be coupled to the communication path 120 and communicatively coupled to the computing device 130. The weather sensors 152 may be any device capable of outputting a signal indicative of a weather condition such as a temperature level, the presence or an amount of precipitation, the direction and/or speed of the wind, the presence and/or intensity of sunlight or the like. Information collected by the weather sensors 152 may provide the vehicle 102 with information that defines the present weather conditions. In response, the vehicle 102, for example, an autonomous vehicle, may reduce its speed in the event heavy rain fall is detected or prepare for longer stopping distances if the temperature is determined to be below freezing (i.e., in anticipation of icy roads). Similarly, for non-autonomous vehicles, information collected and processed from weather sensors, may prepare and enable assistive braking systems based on weather conditions and/or provide alerts to a driver of potentially hazardous road conditions.

The blind spot monitor 154 may include one or more proximity sensors 140, one or more cameras 144, and other sensors to detect the presence of a vehicle in a driver's blind spot. For example, during lane changing maneuvers the blind spot monitor may assist a driver in determining whether the lane in which they plan to enter is clear of traffic.

The vehicle 102 may also include a vehicle speed sensor 156 coupled to the communication path 120 and communicatively coupled to the computing device 130. The vehicle speed sensor 156 may be any sensor or system of sensors for generating a signal indicative of vehicle speed. For example, without limitation, a vehicle speed sensor 156 may be a tachometer that is capable of generating a signal indicative of a rotation speed of a shaft of the vehicle 102 engine or a drive shaft. Signals generated by the vehicle speed sensor 156 may be communicated to the computing device 130 and converted a vehicle speed value. The vehicle speed value is indicative of the speed of the vehicle 102. In some embodiments, the vehicle speed sensor 156 comprises an opto-isolator slotted disk sensor, a Hall Effect sensor, a Doppler radar, or the like. In some embodiments, a vehicle speed sensor 156 may comprise data from a GPS 150 for determining the speed of a vehicle 102. The vehicle speed sensor 156 may be provided so that the computing device 130 may determine when the vehicle 102 accelerates, maintains a constant speed, slows down or is comes to a stop. For example, a vehicle speed sensor 156 may provide signals to the computing device 130 indicative of a vehicle 102 slowing down due to a change in traffic conditions or prior to the vehicle performing a turning maneuver.

Still referring to FIG. 2, the steering wheel sensor system 158 may be coupled to the communication path 120 and communicatively coupled to the computing device 130. The steering wheel sensor system 158 may comprise a plurality of sensors located in the steering wheel for determining a driver grip on the steering wheel, the degree of rotation applied to the steering wheel or the forces applied in turning or maintaining the steering wheel. The steering wheel sensor system 158 may provide signals to the computing device 130 indicative of the location and number of hands on the steering wheel, the strength of the grip on the steering wheel, or changes in position of one or more hands on the steering wheel. The steering wheel sensor system 158, for example, without limitation, may include pressure sensors, inductive sensors, optical sensors, or the like. In addition to detecting the location, number, grip, and change in position of one or more hands on the steering wheel, the steering wheel sensor system 158 may also include one or more sensors indicating the rotational angle of the steering wheel and provide corresponding signals to the computing device 130.

In some embodiments, the vehicle 102 may include a LIDAR system 160. The LIDAR system 160 is communicatively coupled to the communication path 120 and the computing device 130. A LIDAR system 160 or light detection and ranging is a system and method of using pulsed laser light to measure distances from the LIDAR system 160 to objects that reflect the pulsed laser light. A LIDAR system 160 may be made as solid-state devices with few or no moving parts, including those configured as optical phased array devices where its prism-like operation permits a wide field-of-view without the weight and size complexities associated with a traditional rotating LIDAR system 160. The LIDAR system 160 is particularly suited to measuring time-of-flight, which in turn can be correlated to distance measurements with objects that are within a field-of-view of the LIDAR system 160. By calculating the difference in return time of the various wavelengths of the pulsed laser light emitted by the LIDAR system 160, a digital 3-D representation of a target or environment may be generated. The pulsed laser light emitted by the LIDAR system 160 include emissions operated in or near the infra-red range of the electromagnetic spectrum, for example, having emitted radiation of about 905 nanometers. Sensors such as LIDAR systems 160 can be used by vehicles 102 to provide detailed 3D spatial information for the identification of objects near a vehicle 102, as well as the use of such information in the service of systems for vehicular mapping, navigation and autonomous operations, especially when used in conjunction with geo-referencing devices such as GPS 150 or a gyroscope-based inertial navigation unit (INU, not shown) or related dead-reckoning system.

Still referring to FIG. 2, vehicles are now more commonly equipped with vehicle-to-vehicle communication systems. Some of the systems rely on network interface hardware 170. The network interface hardware 170 may be coupled to the communication path 120 and communicatively coupled to the computing device 130. The network interface hardware 170 may be any device capable of transmitting and/or receiving data with a network 180 or directly with another vehicle (e.g., vehicle 104 or 106) equipped with a vehicle-to-vehicle communication system. Accordingly, network interface hardware 170 can include a communication transceiver for sending and/or receiving any wired or wireless communication. For example, the network interface hardware 170 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, network interface hardware 170 includes hardware configured to operate in accordance with the Bluetooth wireless communication protocol. In another embodiment, network interface hardware 170 may include a Bluetooth send/receive module for sending and receiving Bluetooth communications to/from a network 180 and/or another vehicle.

Figure 3:
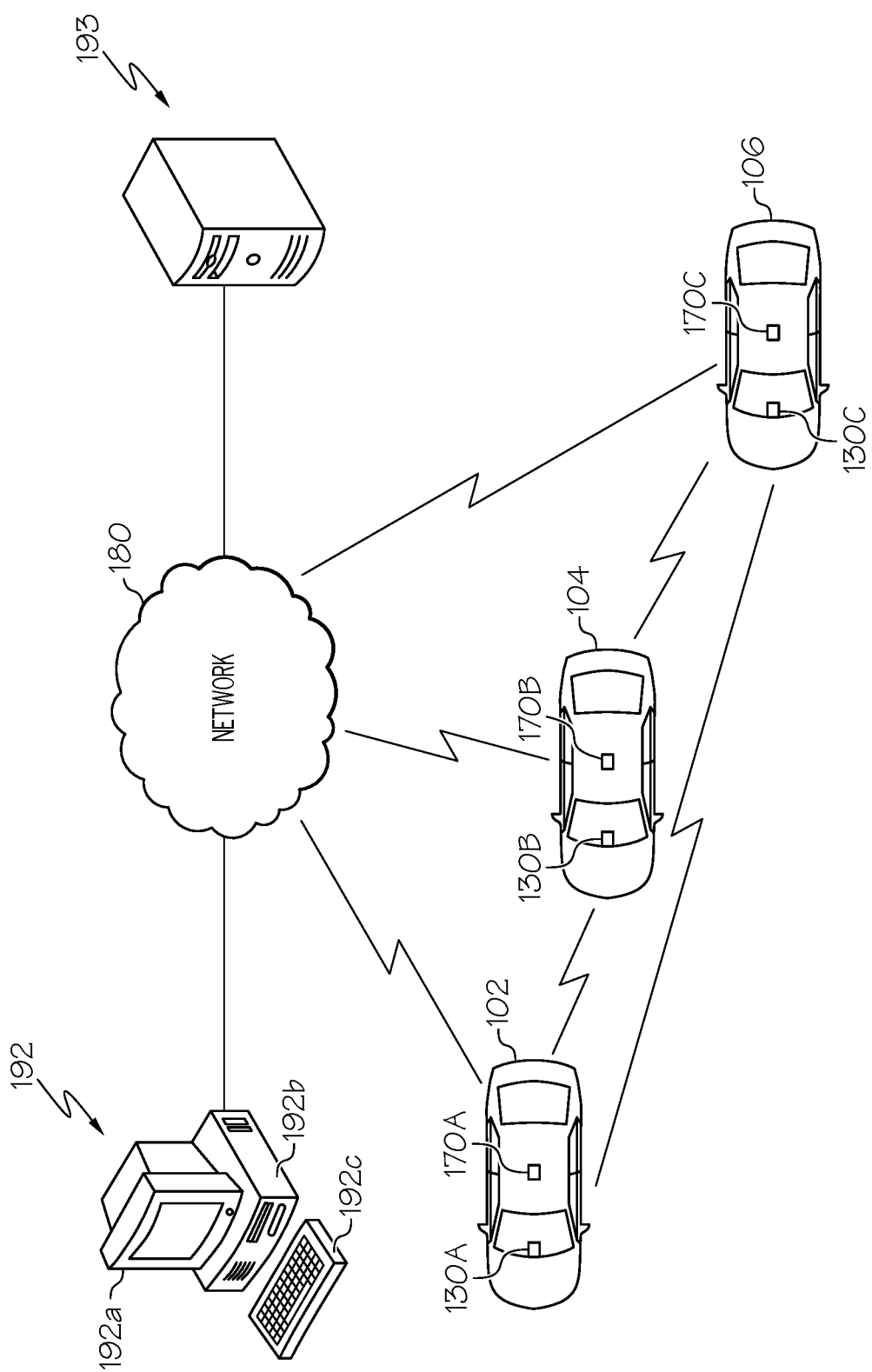
FIG. 3 depicts an illustrative embodiment of a convoy communication system according to one or more embodiments shown and described herein.

Referring now to FIG. 3, an illustrative embodiment of a convoy communication system is depicted. In some embodiments, communication between vehicles 102, 104 and 106 of a convoy may be direct. That is, a first vehicle 102 may communicate directly with a second vehicle 104 and/or a third vehicle 106, the second vehicle 104 may communicate directly with the first vehicle 102 and/or the third vehicle 106, and the third vehicle 106 may communicate directly with the first vehicle 102 and/or the second vehicle 104. In some embodiments, the vehicles 102, 104 and 106 of a convoy may communicate with each other through a network 180. In yet some embodiments, the vehicles 102, 104 and 106 of a convoy may communicate with one or more remote computing device 192 and/or one or more server 193.

The network 180 may include one or more computer networks (e.g., a personal area network, a local area network, or a wide area network), cellular networks, satellite networks and/or a global positioning system and combinations thereof. Accordingly, the vehicles 102, 104 and 106 of a convoy and the one or more remote computing device 192 and/or one or more server 193 may be communicatively coupled to each other through the network 180 via wires or wireless technologies, via a wide area network, via a local area network, via a personal area network, via a cellular network, via a satellite network, or the like. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM.

In particular, FIG. 3 depicts a first vehicle 102 having a computing device 130A, a set of sensor resources (e.g., as shown and described with respect to FIG. 2), and network interface hardware 170A, a second vehicle 104 having a computing device 130B, a set of sensor resources (e.g., as shown and described with respect to FIG. 2), and network interface hardware 170B, and a third vehicle having a computing device 130C, an set of sensor resources (e.g., as shown and described with respect to FIG. 2), and network interface hardware 170C. As described in more detail herein, each of the vehicles in the convoy, for example, the first vehicle 102, the second vehicle 104, and the third vehicle 106 may be delegated a task. As used herein, "delegated" refers to assigning a task to one vehicle such that other vehicles traveling in the convoy may not need perform the same task, rather the other vehicles may receive the results of the task from the one vehicle assigned the task. The task may include the collection of information from one or more sensor resources and processing of the collected information by the vehicle's computing device (e.g., computing devices 130A, 130B, and 130C). Once a result is generated from the processing of the collected information, each of the vehicles (e.g., the first vehicle 102, the second vehicle 104, and the third vehicle 106) may transmit the result to the other vehicles in the convoy. The communication between the vehicles of the convoy (e.g., the first vehicle 102, the second vehicle 104, and the third vehicle 106) may be completed directly via a vehicle-to-vehicle communication or through a network 180 that communicatively connects the vehicles 102, 104, and 106.

In some embodiments, one or more remote computing device 192 and/or one or more server 193 may determine whether a vehicle belongs to a convoy, delegate and manage the tasks delegated to vehicles of the convoy, and coordinate the communication of the results of the delegated tasks among the vehicles of the convoy. In some embodiments, one of the vehicles, for example, the computing device 130A of the first vehicle 102 may determine whether a vehicle belongs to a convoy, delegate and manage the tasks delegated to vehicles of the convoy, and coordinate the communication of results of the delegated tasks among the vehicles of the convoy. In yet other embodiments, a combination of a computing device of a vehicle in the convoy and the one or more remote computing device 192 may facilitate management of the distribution of data collection and processing of the same among vehicles traveling in a convoy.

The following sections will now describe embodiments of the operation of the systems and methods for managing the distribution of data collection and processing of the same among vehicles traveling in a convoy.

A premise of the disclosure herein is to supplement systems not available on each vehicle of the convoy and to reduce the redundancy of the collection of sensor information and processing of the sensor information among vehicles of the convoy. For example, if two vehicles are traveling together in a convoy and the first vehicle includes a set of sensor resources and/or systems that the second vehicle does not, the first vehicle may be tasked with providing the collected and processed information from the set of sensors and/or systems not configured on the second vehicle to the second vehicle. By way of another example, a first vehicle may be traveling in a convoy with a second vehicle and be positioned in such a way with the second vehicle that the first vehicle may collect and process information that is relevant to both vehicles so that the second vehicle may conserve or allocate computing resources to other tasks.

Figure 4:
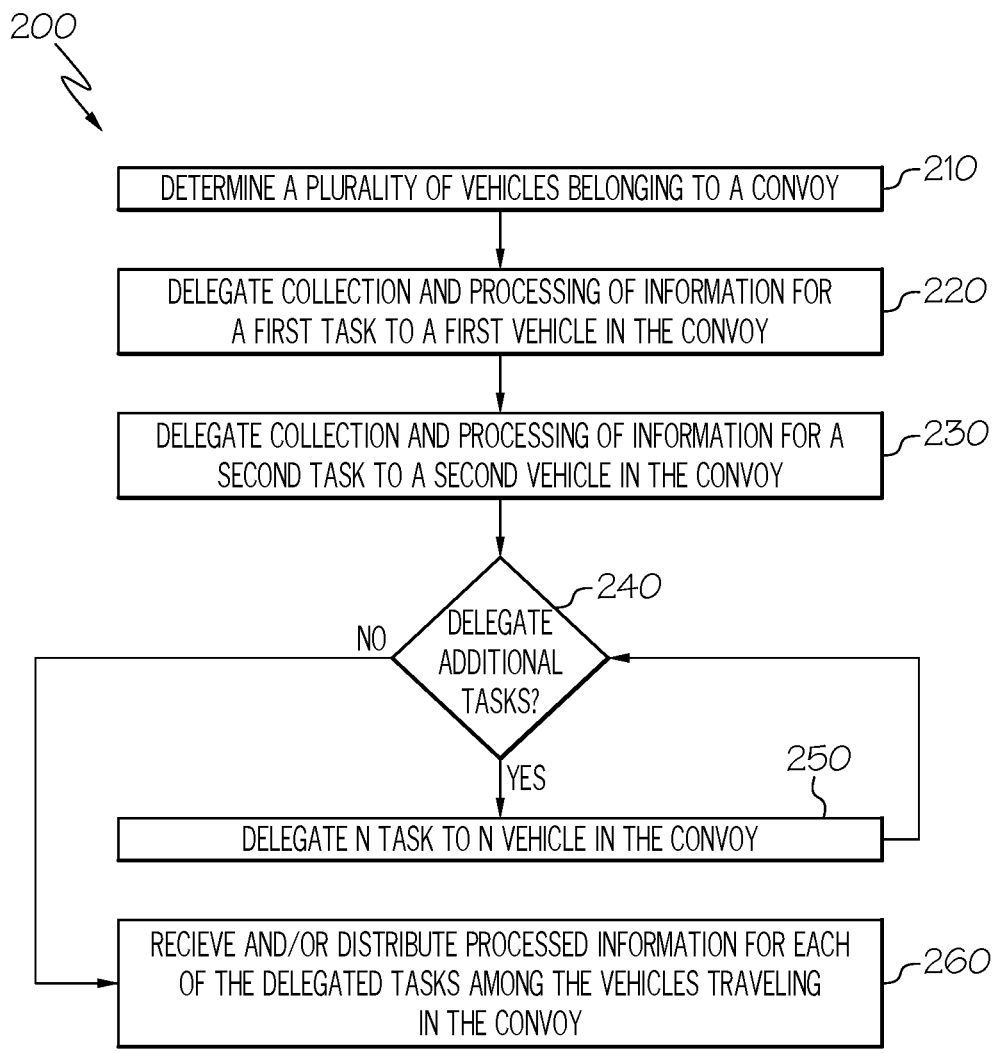
FIG. 4 depicts a flowchart of an example method for managing the distribution of data collection and processing of the same among vehicles traveling in a convoy according to one or more embodiments shown and described herein.

Referring now to FIG. 4, a flowchart 200 of an example method for managing the distribution of data collection and processing of the same among vehicles traveling in a convoy is depicted. As described above, the method may be carried out by a computing device of a vehicle in the convoy, a remote computing device, or a combination of both. The flowchart 200 depicted in FIG. 4 is a representation of a machine-readable instruction set stored in the non-transitory computer readable memory 134 and executed by the processor 132 of a computing device 130 or a remote computing device 192. The process of the flowchart 200 in FIG. 4 may be executed at various times and in response to signals from the sensors communicatively coupled to the computing device 130 or the remote computing device 192.

In particular, at block 210, the computing device determines a plurality of vehicles that belong to a convoy. Member vehicles may be determined through a number of means. For example, a first vehicle may broadcast a signal to vehicles in the area. The signal may prompt other vehicles to provide a response through their computing device and network interface hardware of the desire to join the convoy. In some embodiments, vehicles configured with the convoy management system that is described herein, may include a unique identification. For example, a first vehicle seeking to join a second vehicle to form a convoy (e.g., because they are traveling the same route and/or to the same destination at similar or the same time) may look up the second vehicle's unique identification and transmit a request to the second vehicle based on the unique identification to form a convoy. A remote computing device may provide an application through an application interface to facilitate this (e.g., through a web application deployed in a vehicle or webpage hosted by a server or an application configured within the memory of a computing device of a vehicle). The application may provide access to a database of vehicles configured to join a convoy. Through a separate operation, a user, for example through a mobile device, a vehicle interface, a remote computing device, or the like, may select one or more vehicles that form a convoy or request to join another vehicle to form a convoy. Based on the received inputs, the system may determine the plurality of vehicles belonging to the convoy, at block 210.

In some embodiments, upon joining a convoy, the set of sensor resources and/or systems configured within the vehicles of the convoy are communicated to the computing device implementing the method described herein. For example, when a second vehicle joins a first vehicle in a convoy, the set of sensor resources configured within the second vehicle are provided to the computing device of the first vehicle that is managing the convoy. In other embodiments, the computing device may receive a make, a model, and/or trim package identifier for a vehicle and look up, for example, in a network-connected database, the set of sensor resources configured in the vehicle. When joining a convoy, a vehicle may provide a vehicle identification number (VIN) or specifications for the vehicle so that the convoy management system may delegate tasks to the vehicle according to the set of sensor resources configured in the vehicle.

The computing device may then delegate the collection and processing of information for a first task to the first vehicle, at block 220. For example, the delegation of the first task to the first vehicle may be based on the presence of a sensor or system configured in the first vehicle but not in the second vehicle. The first vehicle may include around view monitoring through the implementation of cameras, proximity sensors, and/or the like, while the second vehicle may not include such a system. Therefore, results of the task of around view monitoring processed by the first computing device of the first vehicle may be relevant and useful to the second vehicle while traveling in a convoy together.

In another embodiment, each vehicle may include the same or a similar set of sensor resources. In such an embodiment, the first task that is delegated to the first vehicle may be delegated to the first vehicle because the first vehicle is in a better position to obtain the information than the second vehicle. For example, if the first vehicle is traveling in front of the second vehicle, the task of detecting objects or hazards on the road in front of the convoy may be delegated to the first vehicle and the results of which are shared with the second vehicle. By way of another example, the first task may include determining traffic conditions, sign recognition for navigation, and/or the presence of construction or an accident.

The computing device may further delegate the collection and processing of information for a second task to the second vehicle, at block 230. For example, the delegation of the second task to the second vehicle may be based on the presence of a sensor or system configured in the second vehicle but not in the first vehicle. The second vehicle may include weather sensors configured to determine whether it is raining, whether the roads may be icy, the temperature outside, a visibility distance, or the like. Therefore, weather conditions may be determined and provided to another vehicle in the convoy, for example the first vehicle, which may not be equipped with weather sensors.

The tasks that may be delegated may further include, for example, but not limited to, tasks related to navigation, determining weather conditions, monitoring lanes around, behind, and/or in front of the convoy in order to coordinate convoy maneuvers, or the like. The delegation of tasks may depend on sensor resources configured on each vehicle of the convoy, the position of the vehicle in the convoy, the amount of processing resources required to complete a task, and the like. For example, the computing device may delegate a first task to the first vehicle and further instruct the first vehicle to be the lead vehicle of the convoy (e.g., as secondary condition). The computing device may subsequently delegate a second task to the second vehicle and further instruct the vehicle to follow the first vehicle within a predefined distance from the first vehicle. In the event a secondary condition associated with a task, such as being the lead vehicle or maintaining a following distance, fails to be followed, then the computing device may redelegate the task and/or require other vehicles in the convoy to provide coverage for the task while the secondary condition is not met by the second vehicle.

For example, if the first vehicle is delegated the task of monitoring the roadway in front of the vehicle for hazards such as objects in the roadway or potholes and the first vehicle is overtaken by the second vehicle in the convoy, the computing device may transfer the delegated task to the second vehicle while the second vehicle maintains the lead position of the convoy. The position of the vehicles within the convoy may be determined through GPS signals shared by each of the vehicles in the convoy with the computing device managing the convoy. As stated above, the computing device that is managing the convoy may be a computing device of a vehicle of the convoy, a remote computing device connected to the vehicles of the convoy via a network, or a combination of both.

Still referring to the flowchart 200 in FIG. 4, at block 240, the computing device determines whether there are additional tasks to be delegated among the two or more vehicles making up the convoy. If additional tasks are to be delegated, then the computing device may delegate those tasks to one of the vehicles of the convoy, at block 250. In the event there are no additional tasks to delegate, the computing device may then coordinate, receive, and/or distribute the processed information for each of the delegated tasks among the vehicles traveling in the convoy, at block 260. For example, where the system in managed by a computing device of a vehicle of the convoy, the computing device may provide an address (e.g., such as an internet protocol or other communication identification number) for each vehicle traveling in the convoy with all of the vehicles in the convoy so that each vehicle may send a communication with the results of their delegated task directly to the other vehicles of the convoy. In another example, where the system is managed by a computing device, such as a remote computing device, the computing device may receive the results of the delegated tasks from each of the vehicles in the convoy and distribute the results of the delegated tasks to the vehicles in the convoy that the tasks was not delegated to. In other words, the computing device manages the collection and transmission of information among the vehicles of the convoy.

By way of example, the computing device implementing the vehicle convoy management method may receive, from a first vehicle, a first information generated in response to the first vehicle completing the first task with the first set of sensor resources. The computing device may further receive, from a second vehicle, a second information generated in response to the second vehicle completing the second task with the second set of sensor resources; and then transmit at least one of the first information or the second information to at least one vehicle.

Figure 5:
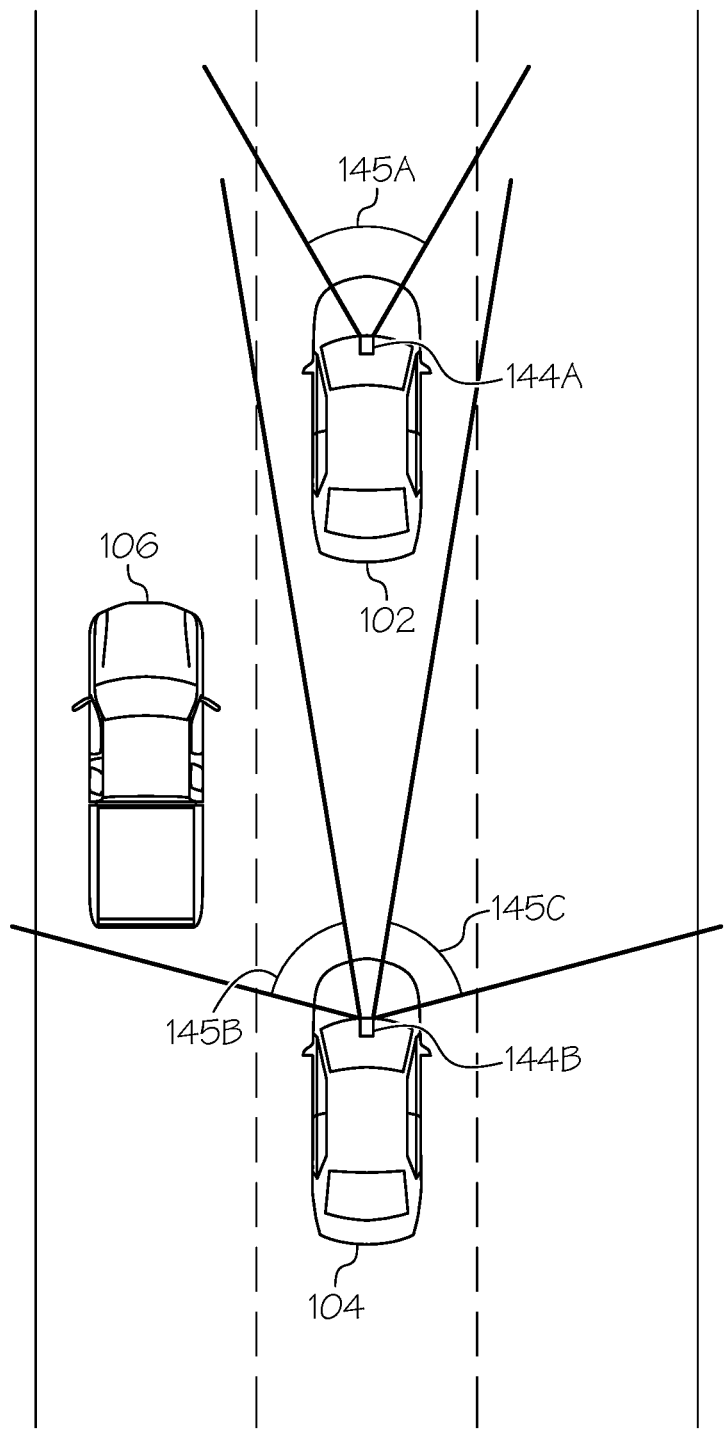
FIG. 5 depicts an illustrative embodiment of delegating tasks of monitoring and processing image data for portions of an environment according to one or more embodiments shown and described herein.

Turning to FIG. 5, an illustrative example of a convoy having two vehicles 102 and 104 is depicted. In the illustrative example, the first vehicle 102 is traveling as the lead vehicle with respect to the second vehicle 104 in the convoy. The computing device has delegated a first task of monitoring the environment in front of the convoy for object, hazards, and traffic. For example, the first vehicle 102 includes a first camera 144A positioned to view the environment in front of the first vehicle 102. The first vehicle 102 receives image data from the first camera 144A within a field-of-view 145A. The computing device of the first vehicle 102 processes the image data and provides the second vehicle 104 with alerts and/or information regarding the presence of objects, hazards, and/or traffic conditions.

The computing device has further delegated a second task of around view monitoring and blind spot monitoring for the convoy to the second vehicle 104. In the example illustrated in FIG. 4, the second vehicle 104 includes at least one camera 144B positioned to view portions of an environment in front of the second vehicle 104. Since the first vehicle 102 is tasked with monitoring the environment in front of the convoy, the task delegated to the second vehicle 104 specifies two field-of-views 145B and 145C for which the second vehicle is responsible for monitoring, collecting image data from, and processing the image data to determine the presence of other vehicles and/or objects. For example, as depicted the field-of-view directly in front of the second vehicle 104 does not need to be processed by the second vehicle 104 since the first task that is delegated to the first vehicle 102 covers that particular field-of-view. Furthermore, the second task that is delegated to the second vehicle 104 provides the first vehicle 102 with around view monitoring and/or blind spot monitoring. For example, should the first vehicle 102 plan to make a lane change to the left, the information received from the second vehicle 104 with respect to the second task of around view monitoring and blind spot monitoring, the first vehicle 102 may make an informed lane change maneuver.

It should now be understood that embodiments described herein are directed to vehicle convoy systems and methods for managing the distribution of data collection and processing of the same among vehicles traveling in a convoy. The systems and methods described herein may utilize vehicle computing devices and sensor resources of the vehicles traveling together in a convoy to delegate tasks among the vehicles within the convoy to supplement or reduce the redundancy of computing information collected about an environment the convoy is traveling. A computing device, either within a vehicle or connected to the vehicles of the convoy may determine the members of a convoy, delegate tasks to one or more vehicles of the convoy, and manage the distribution of the results of the delegated tasks to the other vehicles of the convoy according to the embodiments shown and described herein.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle convoy management system comprising:
   a computing device configured to:
      determine a first vehicle and a second vehicle form a convoy;
      delegate a first task to the first vehicle based on a first set of sensor resources of the first vehicle configured to sense attributes about an environment around the first vehicle defined by the first task;
      delegate a second task to the second vehicle based on a second set of sensor resources of the second vehicle configured to sense attributes about the environment around the second vehicle defined by the second task, wherein the first task is distinct from the second task;
      receive, from the first vehicle, a first information generated in response to the first vehicle completing the first task with the first set of sensor resources;
      receive, from the second vehicle, a second information generated in response to the second vehicle completing the second task with the second set of sensor resources; and
      transmit at least one of the first information or the second information to at least one vehicle.

2. The vehicle convoy management system of claim 1, further comprising the first vehicle and the second vehicle, wherein:
   the first vehicle includes a first computing device and the first set of sensor resources,
   the second vehicle includes a second computing device and the second set of sensor resources,
   the first computing device configured to communicate with the second computing device, and
   the second computing device configured to communicate with the first computing device.

3. The vehicle convoy management system of claim 2, further comprising a third vehicle having a third set of sensor resources and a third computing device, wherein:
   the third computing device is configured to communicate with the first computing device and the second computing device; and
   wherein the computing device is configured to:
      determine the convoy further includes the third vehicle; and
      delegate a third task to the third vehicle based on the third set of sensor resources of the third vehicle, wherein the third task is distinct from the first task and the second task.

4. The vehicle convoy management system of claim 2, wherein the second vehicle includes one or more distinct sensor resources in the second set of sensor resources not included in the first set of sensor resources of the first vehicle, and the delegation of the second task to the second vehicle is based on the one or more distinct sensor resources of the second set of sensor resources.

5. The vehicle convoy management system of claim 2, wherein the first computing device of the first vehicle transmits alerts to the second computing device of the second vehicle when a presence of a hazard or an object in a road in front of the convoy is determined based on the first task.

6. The vehicle convoy management system of claim 1, wherein the first task that is delegated to the first vehicle includes a secondary condition, wherein the secondary condition requires that the first vehicle travel in front of the second vehicle in the convoy.

7. The vehicle convoy management system of claim 6, wherein when the secondary condition fails to be met, the computing device is configured:
   redelegate the first task to another vehicle in the convoy.

8. The vehicle convoy management system of claim 1, wherein the computing device is configured to:
   receive a vehicle identification number of the first vehicle; and identify the first set of sensor resources of the first vehicle based on the vehicle identification number of the first vehicle.

9. The vehicle convoy management system of claim 1, wherein determining the convoy includes the first vehicle and the second vehicle is based on a request from the second vehicle to form the convoy with the first vehicle.

10. A vehicle comprising:
a computing device configured to:
determine the vehicle and a second vehicle form a convoy;
delegate a first task to the vehicle based on a first set of sensor resources of the vehicle configured to sense attributes about an environment around the vehicle defined by the first task;
delegate a second task to the second vehicle based on a second set of sensor resources of the second vehicle configured to sense attributes about the environment around the second vehicle defined by the second task, wherein the first task is distinct from the second task;
generate a first information in response to the first task with the first set of sensor resources;
receive, from the second vehicle, a second information generated in response to the second vehicle completing the second task with the second set of sensor resources; and
transmit the first information to the second vehicle.

11. The vehicle of claim 10, wherein the computing device is configured to:
determine the convoy further includes a third vehicle; and
delegate a third task to the third vehicle based on a third set of sensor resources of the third vehicle, wherein the third task is distinct from the first task and the second task.

12. The vehicle of claim 10, wherein the first task that is delegated to the vehicle includes a secondary condition, wherein the secondary condition requires that the vehicle travel in front of the second vehicle in the convoy.

13. The vehicle of claim 12, wherein when the secondary condition fails to be met, the computing device is configured to:
redelegate the first task to another vehicle in the convoy.

14. The vehicle of claim 10, wherein the computing device is configured to:
receive a vehicle identification number of the second vehicle; and
identify the second set of sensor resources of the second vehicle based on the vehicle identification number of the second vehicle.

15. A vehicle convoy management method comprising:
determining a first vehicle and a second vehicle form a convoy;
delegating a first task to the first vehicle based on a first set of sensor resources of the first vehicle;
delegating a second task to the second vehicle based on a second set of sensor resources of the second vehicle, wherein the first task is distinct from the second task;
receiving, from a first computing device of the first vehicle, a result of the first task that is delegated to the first vehicle; and
transmitting, to a second computing device of the second vehicle, the result of the first task that is delegated to the first vehicle.

16. The vehicle convoy management method of claim 15, further comprising:
receiving, from the second computing device of the second vehicle, a result of the second task that is delegated to the second vehicle; and
transmitting, to the first computing device, the result of the second task that is delegated to the second vehicle.

17. The vehicle convoy management method of claim 15, further comprising:
receiving, from the first computing device, a vehicle identification number of the first vehicle; and
identifying the first set of sensor resources of the first vehicle based on the vehicle identification number of the first vehicle.

18. The vehicle convoy management method of claim 15, wherein determining the convoy includes the first vehicle and the second vehicle further comprises:
receiving, from the second computing device of the second vehicle, a request to form the convoy with the first vehicle.

19. The vehicle convoy management method of claim 15, wherein the first task that is delegated to the first vehicle includes a secondary condition, wherein the secondary condition requires the first vehicle travel in front of the second vehicle in the convoy.

20. The vehicle convoy management method of claim 19, further comprising:
redelegating the first task to another vehicle in the convoy when the secondary condition fails to be met.

* * * * *